United States Patent
Sukegawa et al.

(10) Patent No.: US 11,319,892 B2
(45) Date of Patent: May 3, 2022

(54) INTERNAL-COMBUSTION ENGINE CONTROL DEVICE

(71) Applicant: Hitachi Automotive Systems, Ltd., Hitachinaka (JP)

(72) Inventors: Yoshihiro Sukegawa, Tokyo (JP); Toshihiro Aono, Tokyo (JP); Masayuki Saruwatari, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 361 days.

(21) Appl. No.: 16/626,643

(22) PCT Filed: Jul. 5, 2018

(86) PCT No.: PCT/JP2018/025463
§ 371 (c)(1),
(2) Date: Dec. 26, 2019

(87) PCT Pub. No.: WO2019/026521
PCT Pub. Date: Feb. 7, 2019

(65) Prior Publication Data
US 2021/0285395 A1    Sep. 16, 2021

(30) Foreign Application Priority Data
Aug. 4, 2017   (JP) .............................. JP2017-151440

(51) Int. Cl.
*F02D 41/22*     (2006.01)
*F02D 35/02*     (2006.01)
(Continued)

(52) U.S. Cl.
CPC ........... *F02D 41/22* (2013.01); *F02D 35/023* (2013.01); *F02D 41/0085* (2013.01);
(Continued)

(58) Field of Classification Search
CPC ......... F02D 2041/286; F02D 2200/023; F02D 2200/0404; F02D 2200/0406;
(Continued)

(56) References Cited

U.S. PATENT DOCUMENTS 9,567,926 B2 * 2/2017 Takayanagi ........... F02D 41/045
9,863,338 B2 * 1/2018 Higashio ............... F02P 5/1512
(Continued)

FOREIGN PATENT DOCUMENTS

JP         8-319866 A    12/1996
JP        10-196429 A     7/1998
(Continued)

OTHER PUBLICATIONS

International Search Report (PCT/ISA/210) issued in PCT Application No. PCT/JP2018/025463 dated Oct. 16, 2018 with English translation (four (4) pages).
(Continued)

*Primary Examiner* — Carl C Staubach
(74) *Attorney, Agent, or Firm* — Crowell & Moring LLP

(57) ABSTRACT

Provided is a novel internal-combustion engine control device that can accurately determine a combustion state of an air-fuel mixture in a combustion chamber even in a case where operation is switched between a steady operation state and a transient operation state. For this purpose, the internal-combustion engine control device includes a physical quantity detection unit that detects a physical quantity that fluctuates output of the internal-combustion engine, an output fluctuation value calculation unit that calculates an output fluctuation value for each cylinder based on a detection result of the physical quantity detection unit, and a state determination unit that determines a transient operation state or a steady operation state based on a difference or a ratio between a first output fluctuation value of a predetermined
(Continued)

first cylinder and a second output fluctuation value of a predetermined second cylinder calculated by the output fluctuation value calculation unit. Since combustion failure determination is performed in a section determined as the steady state, it is possible to accurately determine a combustion failure state of an air-fuel mixture of a cylinder even in a case where operation is switched between the steady operation state and the transient operation state.

10 Claims, 7 Drawing Sheets

(51) Int. Cl.
  *F02D 41/00* (2006.01)
  *F02D 41/40* (2006.01)
  *F02P 5/15* (2006.01)
(52) U.S. Cl.
  CPC .......... *F02D 41/401* (2013.01); *F02P 5/1504* (2013.01); *F02P 5/1512* (2013.01); *F02D 2200/023* (2013.01); *F02D 2200/0404* (2013.01); *F02D 2200/0406* (2013.01); *F02D 2200/0614* (2013.01); *F02D 2200/101* (2013.01); *F02D 2200/1002* (2013.01); *F02D 2250/21* (2013.01)
(58) Field of Classification Search
  CPC ..... F02D 2200/0614; F02D 2200/1002; F02D 2200/101; F02D 35/023; F02D 41/008; F02D 41/0085; F02D 41/045; F02D 41/1498; F02D 41/22; F02D 41/401; F02P 5/1504; F02P 5/1512
  See application file for complete search history.

(56) References Cited

U.S. PATENT DOCUMENTS

| | | | |
|---|---|---|---|
| 2006/0288768 A1* | 12/2006 | Aono | F02D 41/1498 73/114.38 |
| 2011/0313641 A1* | 12/2011 | Glugla | F02P 5/1528 701/104 |
| 2012/0083994 A1* | 4/2012 | Higuchi | F02D 19/088 701/103 |
| 2015/0260111 A1* | 9/2015 | Maeda | F02P 5/04 123/295 |
| 2021/0079857 A1* | 3/2021 | Aono | F02D 41/1401 |

FOREIGN PATENT DOCUMENTS

| | | |
|---|---|---|
| JP | 2008-190480 A | 8/2008 |
| JP | 2009-293514 A | 12/2009 |
| JP | 2012-77723 A | 4/2012 |
| JP | 2013-40609 A | 2/2013 |

OTHER PUBLICATIONS

Japanese-language Written Opinion (PCT/ISA/237) issued in PCT Application No. PCT/JP2018/025463 dated Oct. 16, 2018 (three (3) pages).

* cited by examiner

INTERNAL-COMBUSTION ENGINE CONTROL DEVICE

TECHNICAL FIELD

The present invention relates to an internal-combustion engine control device, and more particularly to an internal-combustion engine control device that controls a control parameter of the internal-combustion engine by determining a combustion state of an air-fuel mixture in a combustion chamber.

BACKGROUND ART

In recent years, regulations on a consumed fuel amount (fuel consumption) and exhaust gas harmful components of vehicles such as automobiles have been tightened, and such regulations tend to be further tightened in the future. In particular, regulations on fuel consumption are of great interest due to problems such as recent increases in fuel prices, impacts on global warming, and depletion of energy resources.

Under such circumstances, for example, in the automobile industry, various technical developments have been promoted for the purpose of improving the fuel efficiency performance and exhaust gas purification performance of vehicles. For example, as described in Japanese Patent Application Laid-Open No. 10-196429 (Patent Literature 1), it is known that a combustion pressure sensor that detects combustion pressure created by combustion of air-fuel mixture in a combustion chamber is provided, a torque fluctuation amount is calculated based on a combustion pressure change in each torque generation cycle of a predetermined cylinder detected during a sampling period of the combustion pressure sensor, and a control parameter of an internal-combustion engine, for example, a fuel injection amount and an ignition timing is adjusted so that the calculated torque fluctuation amount converges to a target torque fluctuation amount.

CITATION LIST

Patent Literature

PTL1: JP 10-196429 A

SUMMARY OF INVENTION

Technical Problem

Many internal-combustion engines operate while alternating between a steady operation state in which engine torque (which can be read as engine output) hardly changes on a time axis (for example, a state where an accelerator pedal depression amount is almost constant) and a transient operation state in which the engine torque is increased or decreased on a time axis (for example, a state where an accelerator pedal depression amount is increased or decreased). The internal-combustion engine control device described in Patent Literature 1 detects combustion instability of an air-fuel mixture as a torque fluctuation amount and stabilizes combustion by adjusting a control parameter of the internal-combustion engine.

However, a temporal fluctuation amount of engine torque is large in the transient operation state of the internal-combustion engine. Therefore, in a case where a torque fluctuation amount is calculated based on a combustion pressure change in each torque generation (combustion) cycle of a predetermined cylinder as described in Patent Literature 1, the calculated toque fluctuation amount includes a torque fluctuation amount in the steady operation state and torque fluctuation of the engine torque itself resulting from the transient operation state.

For this reason, in the transient operation state, there is a possibility that it is erroneously determined that combustion is unstable although the combustion of an air-fuel mixture is stable. This produces a new problem that fuel efficiency performance, output performance, and exhaust purification performance of the internal-combustion engine deteriorate as a result of unnecessary adjustment of control parameters.

An object of the present invention is to provide a novel internal-combustion engine control device that can accurately determine a combustion state of an air-fuel mixture in a combustion chamber even when operation is switched between a steady operation state and a transient operation state.

Solution to Problem

The present invention is characterized by including an output fluctuation value calculation unit that calculates an output fluctuation value for each cylinder based on a detection result obtained from a physical quantity detection unit that detects a physical quantity that fluctuates engine torque of an internal-combustion engine, and a state determination unit that determines whether the internal-combustion engine is in a transient operation state or a steady operation state based on a difference or a ratio between a first output fluctuation value of a predetermined first cylinder and a second output fluctuation value of a second cylinder different from the first cylinder that are calculated by the output fluctuation value calculation unit.

Furthermore, the present invention is characterized by including a combustion determination region setting unit that sets a section of the steady operation state as a combustion determination region in a case where the state determination unit determines that the state is the steady operation state, and a combustion failure determination unit that determines that the first cylinder or the second cylinder has combustion failure in a case where an output fluctuation value of the first cylinder or the second cylinder calculated by the output fluctuation value calculation unit is equal to or larger than a setting value in the combustion determination region set by the combustion determination region setting unit.

Advantageous Effects of Invention

According to the present invention, since combustion failure determination is performed in a section determined as the steady operation state, it is possible to accurately determine a combustion failure state of an air-fuel mixture of a cylinder even in a case where operation is switched between the steady operation state and the transient operation state.

DESCRIPTION OF EMBODIMENTS

Hereinafter, embodiments of the present invention will be described in detail below with reference to the drawings. The present invention is not limited to the embodiments below, and various modifications and applications are encompassed within the technical concept of the present invention.

Embodiment 1

Figure 1:
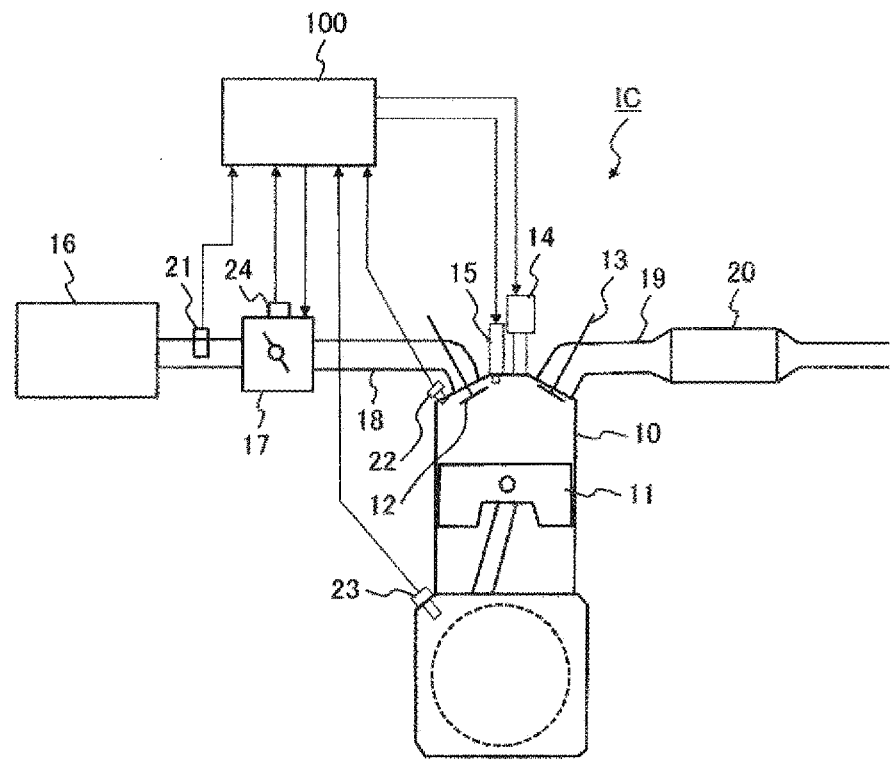
FIG. 1 is a cross-sectional view illustrating a configuration of an internal-combustion engine to which the present invention is applied.

FIG. 1 illustrates a cross section of an internal-combustion engine according to a first embodiment of the present invention. An internal-combustion engine IC is a spark-ignited 4-cycle gasoline internal-combustion engine and has a combustion chamber formed by an engine head, a cylinder 10, a piston 11, an intake valve 12, and an exhaust valve 13. A fuel injection valve 14 is provided in the engine head, and an injection nozzle of the fuel injection valve 14 penetrates a combustion chamber (hereinafter referred to as a cylinder). This constitutes a direct injection internal-combustion engine. The cylinder head is also provided with a spark plug 15. Combustion air is sucked into the cylinder through an air cleaner 16, a throttle valve 17, and an intake port 18. Exhaust gas after combustion is exhausted to the atmosphere through an exhaust port 19 and an exhaust gas purification catalyst 20.

The amount of air taken into the cylinder is detected by an air flow sensor 21. A pressure in the cylinder is detected by an in-cylinder pressure sensor 22 provided in the cylinder head. Further, an engine rotational speed is detected by a crank angle sensor 23, and an opening degree of the throttle valve is detected by a throttle valve opening degree sensor 24. Values detected by these sensors are taken into a control unit 100 and used for state detection and operation control of the internal-combustion engine IC.

Further, the control unit 100 outputs the opening degree of the throttle valve 17, an injection start timing and an injection end timing of the fuel injection valve 14, an ignition timing of the spark plug 15, and the like, and controls the internal-combustion engine IC to a predetermined operating state.

Figure 2:
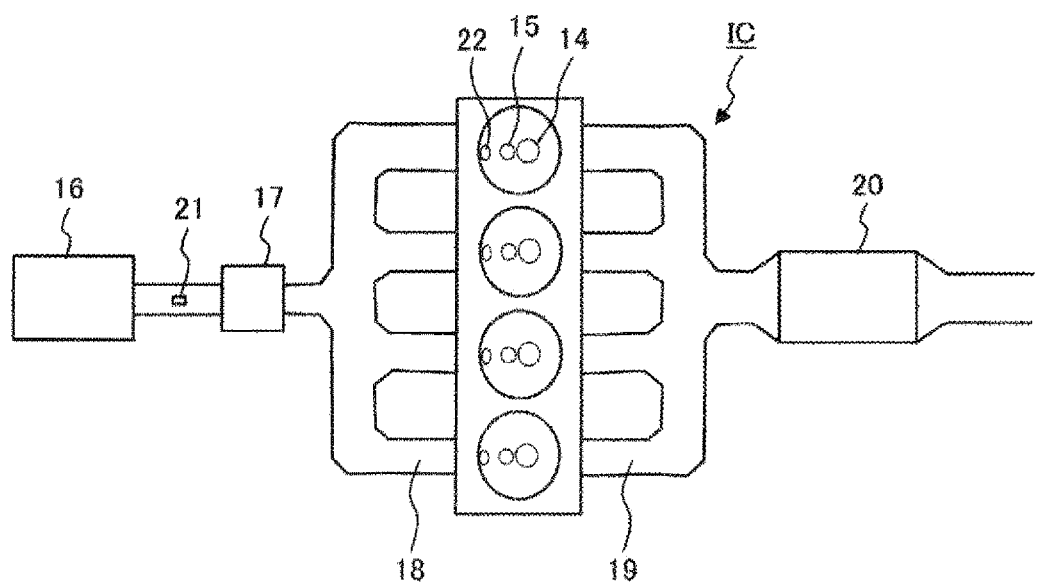
FIG. 2 is a plan view of the internal-combustion engine illustrated in FIG. 1 as viewed from above.

Although only a single cylinder is illustrated in FIG. 1 to illustrate the configuration of the combustion chamber of the internal-combustion engine, the internal-combustion engine according to the embodiment of the present invention is a multi-cylinder internal-combustion engine constituted by two or more cylinders. Hereinafter, a four-cylinder internal-combustion engine will be described as an example, and FIG. 2 illustrates a plan view as viewed from above.

The in-cylinder pressure sensor 22 is provided in each cylinder, and the control unit 100 can independently detect an in-cylinder pressure of each cylinder. Further, the control unit 100 can control the injection start timing and injection end timing of the fuel injection valve 14 and the ignition timing of the spark plug 15 independently for each cylinder.

The control unit 100 takes in an in-cylinder pressure value detected by the in-cylinder pressure sensor 22 every constant crank angle dCA (for example, every crank angle 1°) and calculates an indicated mean effective pressure (Pi) from the following equation (1) by using an in-cylinder pressure sampling value within one combustion cycle from an intake stroke to an exhaust stroke of the internal-combustion engine.

[Equation 1]

$$P_i = \frac{\int (P - P_a)dV}{V} \quad (1)$$

In the equation (1), "P" is a sampled in-cylinder pressure value, "Pa" is an atmospheric pressure, dV is an amount of volume fluctuation in the cylinder during a dCA period, and V is a stroke volume of the cylinder.

Further, a standard deviation (CPi) of an indicated mean effective pressure (Pi) for a predetermined combustion cycle (for example, 100 combustion cycles) is calculated from the following equation (2). Hereinafter, this is defined as an output fluctuation rate (CPi).

[Equation 2]

$$CP_i = \frac{\sqrt{\frac{1}{n}\sum_k (P_i^k - P_{im})^2}}{P_{im}} \quad (2)$$

In the equation 2, "n" is the number of combustion cycles, "$P^k i$" is an indicated mean effective pressure in any combustion cycle, and "Pim" is a mean value of indicated mean effective pressures. In the present embodiment, an output fluctuation rate (CPi) is calculated independently for each cylinder since the in-cylinder pressure sensor 22 is provided in each cylinder.

In a spark-ignited internal-combustion engine, for example, lean combustion (lean burn) or a large amount of exhaust gas recirculation (EGR) combustion is known as a method for improving fuel efficiency of the internal-combustion engine. According to these methods, a pumping loss and a cooling loss in a partial load can be reduced by diluting an air-fuel mixture with air or exhaust gas. In order to obtain higher fuel efficiency, it is effective to increase a dilution rate by increasing the amount of air or exhaust gas.

However, lean combustion and EGR combustion tend to be unstable. In particular, in a multi-cylinder internal-combustion engine, a difference in combustion stability occurs between the cylinders. This causes a problem that a dilution rate limit is suppressed to a low level by a cylinder having low combustion stability (poor combustion stability). Therefore, if a cylinder having low combustion stability is detected and correction control (for example, correction of a fuel injection amount or an ignition timing) is performed to improve combustion stability for the cylinder, the internal-combustion engine as a whole is operated at a high dilution rate. This makes it possible to maximize fuel efficiency.

In order to determine combustion stability, it is general to compare the above output fluctuation rate (CPi) with a predetermined fluctuation rate determination threshold and determine that combustion is unstable if the output fluctuation rate (CPi) is larger than this fluctuation rate determination threshold. However, when the internal-combustion engine is in a transient operation state, the output fluctuation rate (CPi) contains a torque fluctuation component resulting from combustion instability, which is necessary, and a torque fluctuation component resulting from shift of engine torque to target engine torque that occurs while undergoing a predetermined transient change. This may undesirably lead to erroneous determination of whether combustion stability is good or bad.

Figure 3:
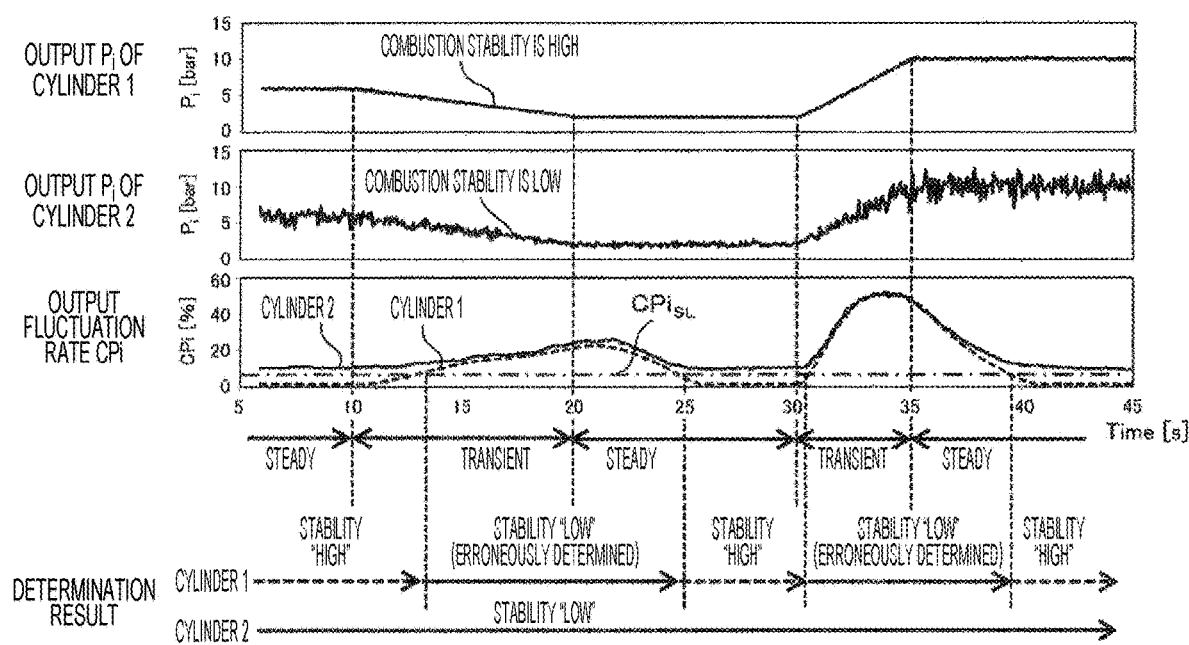
FIG. 3 is an explanatory view for explaining a determination result of combustion stability based on temporal changes of indicated mean effective pressures and output fluctuation rates of two conventional cylinders in a case where operation is switched between a steady operation state and a transient operation state.

Next, a specific example of erroneous determination of whether combustion stability is good or bad will be described with reference to FIG. 3. FIG. 3 illustrates changes of indicated mean effective pressures (Pi) and output fluctuation rates (CPi) of a predetermined cylinder 1 and a predetermined cylinder 2 different from the predetermined cylinder 1 in a case where a multi-cylinder internal-combustion engine is operated in a manner such that engine torque includes a steady operation state and a transient operation state.

In FIG. 3, the engine torque is controlled by the control unit 100 so that a period from 5 to 10 seconds is a steady operation state, a period from 10 to 20 seconds is a transient operation state (engine torque decreases), a period from 20 to 30 seconds is a steady operation state, a period from 30 to 35 seconds is a transient operation state (engine torque increases), and a period 35 to 45 seconds is a steady operation state.

A cylinder 1 is a cylinder having high combustion stability and has an indicated mean effective pressure (Pi) that follows a predetermined output value without oscillation. On the other hand, a cylinder 2 is a cylinder having low combustion stability and has an indicated mean effective pressure (Pi) that undergoes a short-cycle cycle fluctuation.

When comparing the output fluctuation rate (CPi) of the cylinder 1 and the output fluctuation rate (CPi) of the cylinder 2, the output fluctuation rate (CPi) of the cylinder 2 indicated by the solid line is markedly larger than the output fluctuation rate (CPi) of the cylinder 1 indicated by the broken line in a section where the engine torque is in the steady operation state. Therefore, in the steady operation state, it can be correctly determined that the combustion stability of the cylinder 1 is high and the combustion stability of the cylinder 2 is low by comparing the output fluctuation rate (CPi) with a fluctuation rate determination threshold value ($CPi_{SL}$) which is an appropriate "combustion determination threshold value" indicated by a line with alternate long and short dashes. Note that an experimental value calculated experimentally is used as the fluctuation rate determination threshold value ($CPi_{SL}$).

On the other hand, both of the output fluctuation rate (CPi) of the cylinder 1 and the output fluctuation rate (CPi) of the cylinder 2 are large in a section in which the internal-combustion engine is in a transient operation state. This is because the output fluctuation rate (CPi) contains a torque fluctuation component for each combustion cycle resulting from instability of combustion and a torque fluctuation component of engine torque itself resulting from a predetermined transient change. Therefore, when the output fluctuation rate (CPi) is compared with the fluctuation rate determination threshold value ($CPi_{SL}$) in the section where the internal-combustion engine is in the transient operation state, it may be erroneously determined that the cylinder 1, which has high combustion stability, has low combustion stability in addition to the cylinder 2.

Figure 4:
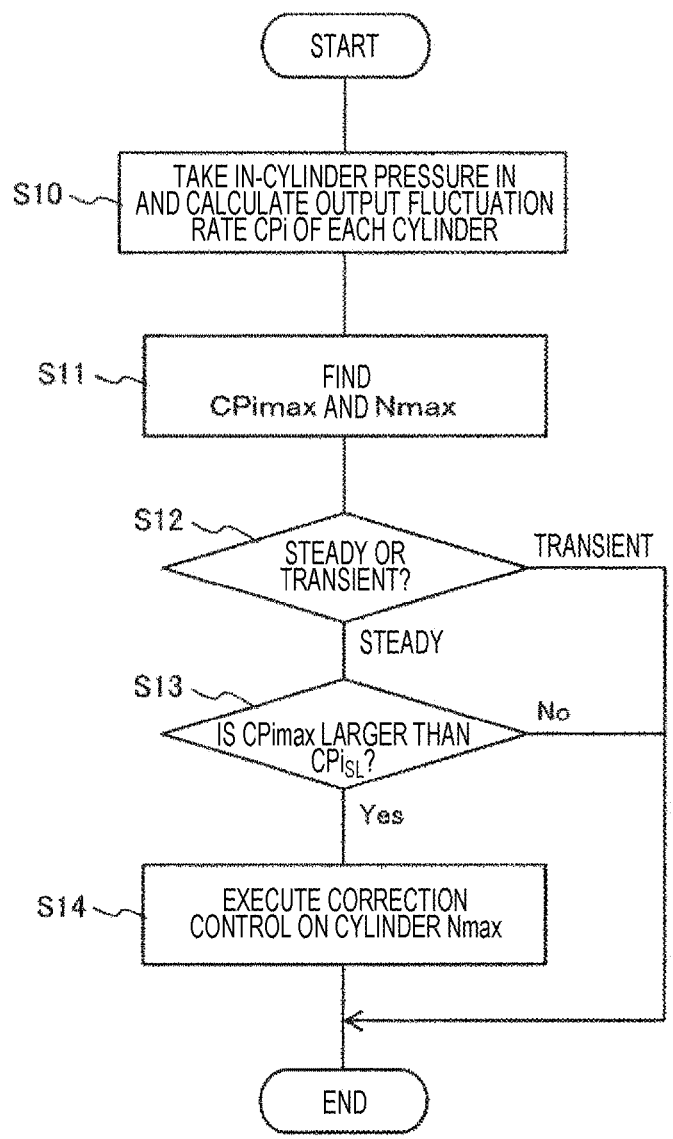
FIG. 4 is a flowchart illustrating a procedure of determination of combustion stability and control parameter correction control according to the first embodiment of the present invention.

Therefore, in the present embodiment, as illustrated in the flowchart illustrated in FIG. 4, combustion stability of each cylinder is determined, and control parameter correction control is performed on a cylinder having low combustion stability. FIG. 4 illustrates a control processing flow executed by the control unit 100.

In FIG. 4, in step S10, an output fluctuation rate (CPi) of each cylinder is calculated from the equations (1) and (2) by using a sampling value of detection output of the in-cylinder pressure sensor 22 of each cylinder. In step S11, a maximum value (CPimax) of an output fluctuation rate is found from among the output fluctuation rates (CPi) of the respective cylinders, and a cylinder number (Nmax) thereof is found.

Subsequently, in step S12, it is determined whether the internal-combustion engine is in a steady operation state or a transient operation state. This determination method will be described with reference to FIG. 5. In a case where it is determined that the internal-combustion engine is in a transient operation state, the processing ends and waits for a next activation timing.

On the other hand, in a case where it is determined that the internal-combustion engine is in a steady operation state, the processing proceeds to step S13, and the maximum value (CPimax) of the output fluctuation rate is compared with a predetermined fluctuation rate determination threshold value ($CPi_{SL}$). A reason why the maximum value (CPimax) is compared is that the other cylinders have an output fluctuation rate (CPi) smaller than the maximum value (CPimax) (have stable combustion). In a case where the maximum value (CPimax) is smaller than the fluctuation rate determination threshold value ($CPi_{SL}$), it is determined that there is no problem with combustion stability, and the processing ends and waits for a next activation timing.

On the other hand, in a case where the maximum value (CPimax) is larger than the fluctuation rate determination threshold value ($CPi_{SL}$), it is determined that combustion stability is poor and the processing proceeds to step S14. In step S14, correction control for stabilizing combustion is executed for the cylinder (Nmax) having the maximum output fluctuation rate. The correction control for stabilizing combustion refers to, for example, increasing a fuel injection amount of the cylinder determined to have unstable combustion as compared with the other cylinders or advancing or delaying a fuel injection timing and an ignition timing as compared with the other cylinders.

That is, increasing the fuel injection amount makes an air-fuel ratio rich. This improves ignitability and flame propagation properties, thereby stabilizing combustion. Further, changing the fuel injection timing optimizes an air-fuel mixture distribution and an in-cylinder air-fuel mixture turbulence intensity, thereby stabilizing combustion. Further, changing the ignition timing optimizes an in-cylinder heat generation center, thereby stabilizing combustion.

It should be noted that what kind of correction control should be performed may be appropriately selected in accordance with an internal-combustion engine system, and further explanation is omitted, but at least one of the fuel injection amount, the fuel injection timing, and the ignition timing need just be corrected next.

Figure 5:
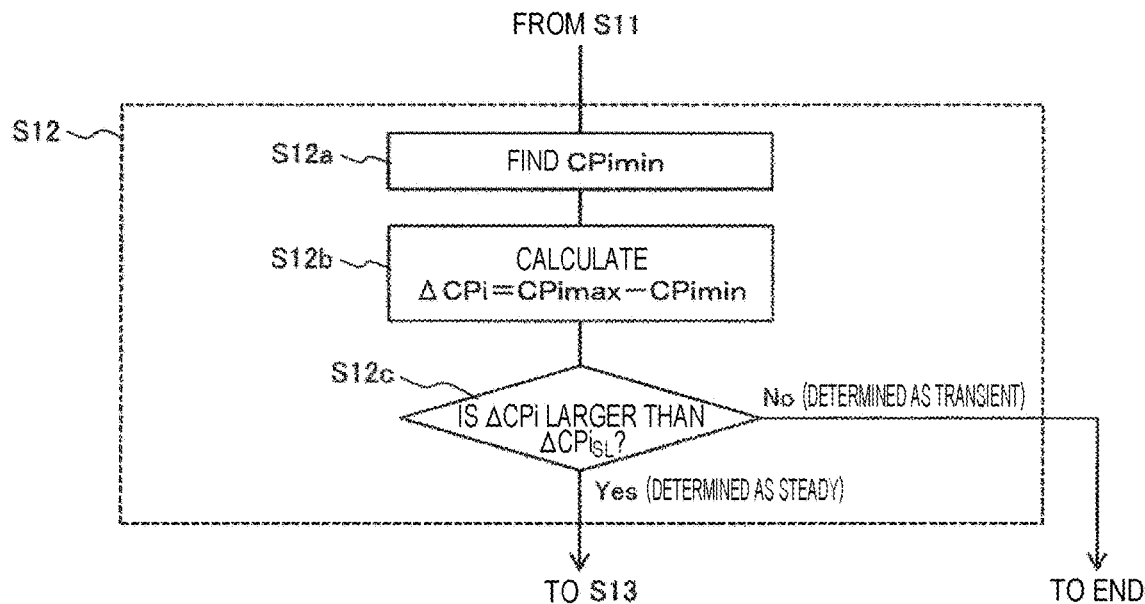
FIG. 5 is a flowchart illustrating a procedure for determining a steady operation state or a transient operation state in step S103 illustrated in FIG. 4.

Next, a method for determining a steady operation state and a transient operation state of the internal-combustion engine will be described with reference to FIG. 5. FIG. 5 illustrates details of step S12 for determining the steady/transient operation state illustrated in FIG. 4.

In step S12*a*, a minimum value (CPimin) of an output fluctuation rate is found from among the output fluctuation rates (CPi) of the respective cylinders. In step S12*b*, a fluctuation rate difference value (ΔCPi) between the maximum value (CPimax) and the minimum value (CPimin) of the output fluctuation rate is obtained by calculating "ΔCPi=CPimax−CPimin".

Subsequently, in step S12*c*, the fluctuation rate difference value (ΔCPi) is compared with a difference value determination threshold value ($\Delta CPi_{SL}$) which is a predetermined "state determination threshold value", and in a case where the fluctuation rate difference value (ΔCPi) is larger than the difference value determination threshold value ($\Delta CPi_{SL}$), it is determined that the internal-combustion engine is in a steady operation state and the processing proceeds to step S13. On the other hand, in a case where the fluctuation rate difference value (ΔCPi) is smaller than the difference value determination threshold value ($\Delta CPi_{SL}$), it is determined that the internal-combustion engine is in a transient operation state, and the combustion stability determination processing flow ends and waits for a next activation timing.

Figure 6:
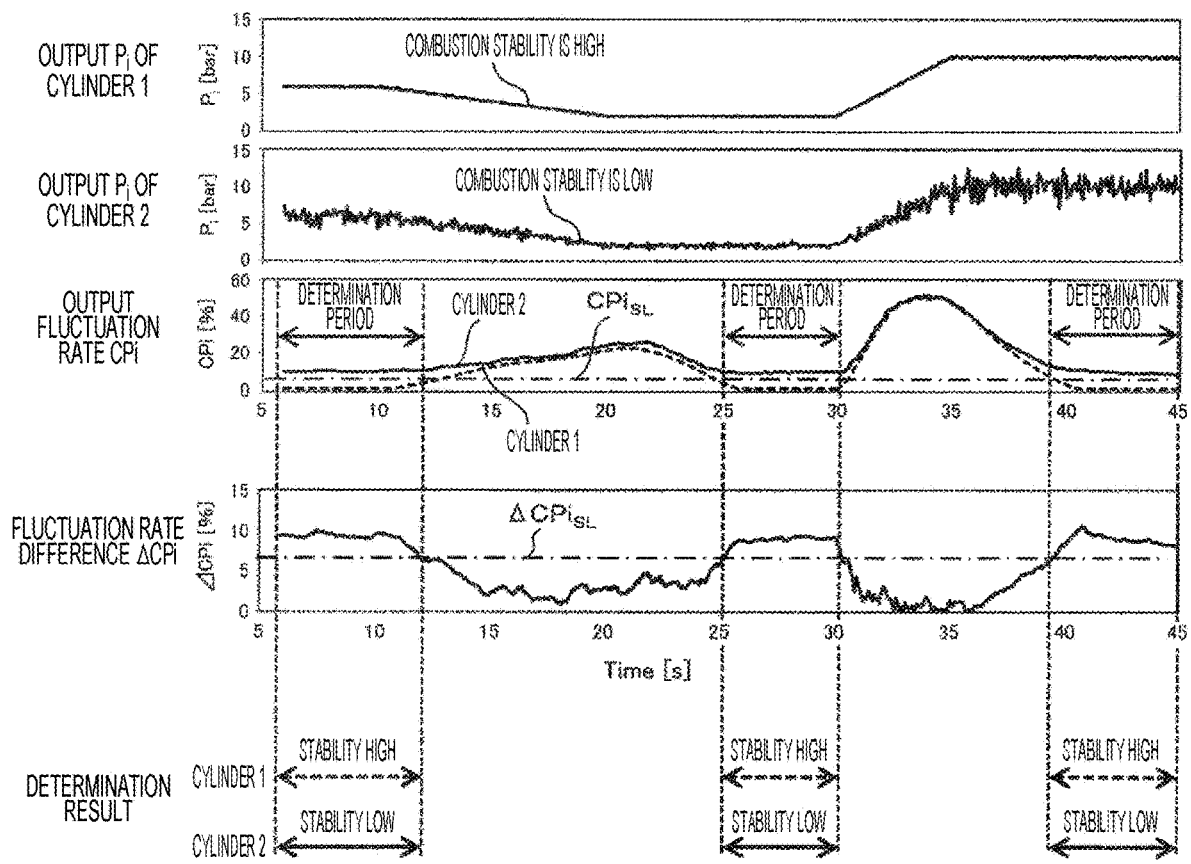
FIG. 6 is an explanatory view for explaining a determination result of combustion stability based on temporal changes of indicated mean effective pressures and output fluctuation rates of two cylinders according to the first embodiment in a case where operation is switched between a steady operation state and a transient operation state.

Next, operations and effects of the present embodiment will be described with reference to FIG. 6. FIG. 6 illustrates changes of indicated mean effective pressures (Pi), output fluctuation rates (CPi), and fluctuation rate difference values (ΔCPi) of the cylinder 1 and the cylinder 2 in a case where a multi-cylinder internal-combustion engine is operated so that the internal-combustion engine includes a steady operation state and a transient operation state. The changes of the indicated mean effective pressures (Pi) and the output fluctuation rates (CPi) are the same as those of FIG. 3.

As illustrated in FIG. 6, the fluctuation rate difference value (ΔCPi) is large in a case where the internal-combustion engine is in a steady operation state and is small in a case where the internal-combustion engine is in a transient operation state. This is because the output fluctuation rate (CPi) in the steady operation state represents only a torque fluctuation component for each combustion cycle resulting from combustion instability, whereas the output fluctuation rate (CPi) in the transient operation state represents a sum of a torque fluctuation component for each combustion cycle resulting from combustion instability and a torque fluctuation component of engine torque itself resulting from a predetermined transient change. Therefore, in the transient operation state, a ratio of the torque fluctuation component for each combustion cycle resulting from instability of combustion to the output fluctuation rate (CPi) decreases, and the fluctuation rate difference value (ΔCPi) becomes small in a cylinder having low combustion stability as compared to a cylinder having high combustion stability.

In view of this, combustion stability is determined from a value of the output fluctuation rate (CPi) only in a case where the fluctuation rate difference value (ΔCPi) is larger than the predetermined difference value determination threshold value ($\Delta CPi_{SL}$). That is, combustion stability is determined only in a steady operation state, and therefore erroneous determination of combustion stability in a transient operation state can be prevented. Since combustion stability is accurately determined in the steady operation state as described above, control parameter correction control is appropriately performed on a cylinder having low combustion stability in steps S13 and S14 illustrated in FIG. 4, and thereby fuel efficiency and exhaust purification performance of the internal-combustion engine can be improved.

Note that the difference value determination threshold value ($\Delta CPi_{SL}$) need not necessarily be a constant value and may change depending on an engine rotational speed, engine torque, an oil temperature, a water temperature, and the like. In a case where the internal-combustion engine is in a transient operation state, the output fluctuation rate (CPi) contains a torque fluctuation component for each combustion cycle and a torque fluctuation component resulting from a transient change. Accordingly, in a case where the torque fluctuation component for each combustion cycle is larger than the torque fluctuation component resulting from the transient change, the fluctuation rate difference value (ΔCPi) becomes larger. This increases a risk of erroneously determining the transient operation state as the steady operation state.

Figure 7:
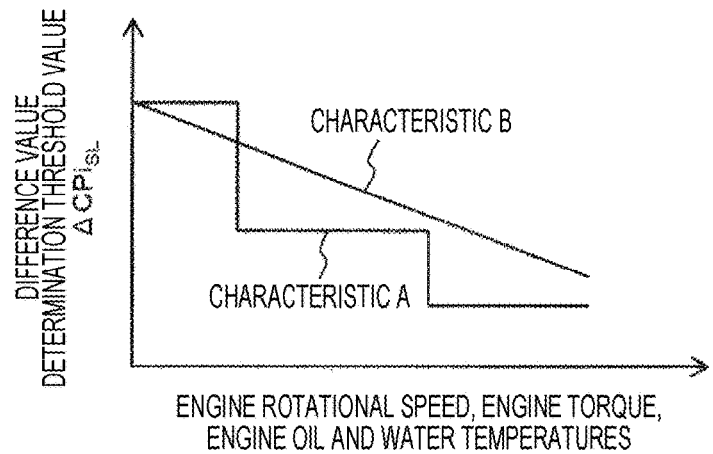
FIG. 7 is a characteristic diagram illustrating an example of a difference value determination threshold value ($\Delta CPi$) illustrated in FIG. 5 relative to an engine rotational speed, torque, an oil temperature, and a water temperature.

In view of this, as illustrated in FIG. 7, it is desirable to increase the difference value determination threshold value ($\Delta CPi_{SL}$) in a state where the engine rotational speed is low, the engine torque is low, or the oil temperature or the water temperature is low, in which state an output fluctuation for each combustion cycle tends to be large. In this case, the difference value determination threshold value ($\Delta CPi_{SL}$) can be lowered stepwise as indicated by the characteristic A and can be further lowered successively as indicated by the characteristic B as the engine rotational speed, the engine torque, the oil temperature, or the water temperature become higher.

Furthermore, under operating conditions where instability of engine torque is very high, for example, in a case where the oil temperature or water temperature is very low or immediately after restart from idling stop, there is a high risk of (1) erroneous determination of a steady operation state or a transient operation state and (2) erroneous determination of combustion stability of the internal-combustion engine. Therefore, in these states, it is desirable to stop (1) determination of a steady operation state or a transient operation state and (2) determination of combustion stability of the internal-combustion engine.

Embodiment 2

Next, a second embodiment of the present invention will be described. The first embodiment proposes an example in which determination of a steady operation state or a transient operation state of an internal-combustion engine is performed using a fluctuation rate difference value (ΔCPi). On the other hand, the second embodiment proposes an example in which determination is performed by using a fluctuation rate ratio.

Figure 8:
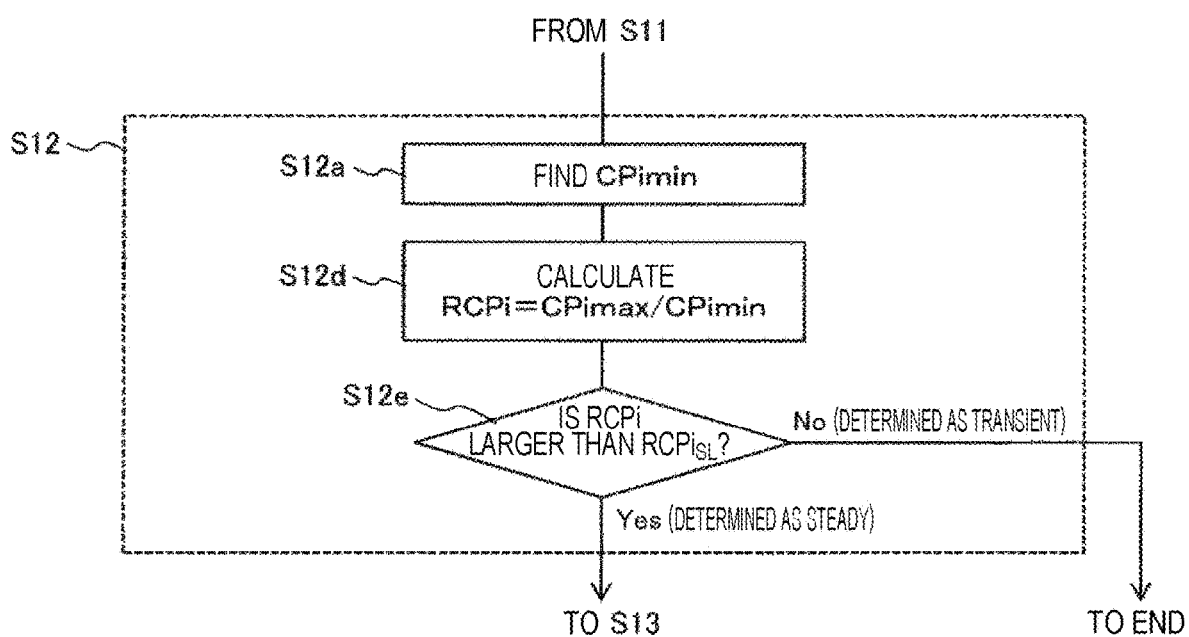
FIG. 8 is a flowchart illustrating a procedure for determining a steady operation state or a transient operation state in the second embodiment of the present invention.

FIG. 8 illustrates details of step S12 in FIG. 4. In step S12a, a minimum value (CPimin) of an output fluctuation rate is found from among output fluctuation rates (CPi) of respective cylinders. In step S12d, a fluctuation rate ratio (RCPi) between a maximum value (CPimax) and the minimum value (CPimin) of the output fluctuation rate is obtained by calculating "RCPi=CPimax/CPimin".

Subsequently, in step S12e, the fluctuation rate ratio (RCPi) is compared with a predetermined fluctuation rate ratio determination threshold value ($RCPi_{SL}$), and in a case where the fluctuation rate ratio (RCPi) is larger than the fluctuation rate ratio determination threshold value ($RCPi_{SL}$), it is determined that a state is a steady operation state, and the processing proceeds to step S13. On the other hand, in a case where the fluctuation rate ratio (RCPi) is smaller than the fluctuation rate ratio determination threshold value ($RCPi_{SL}$), it is determined that the state is a transient operation state, and the combustion stability determination processing flow ends and waits for a next activation timing.

Note that the fluctuation rate ratio (RCPi) described above may be obtained as "RCPi=CPimin/CPimax" by exchanging the denominator and numerator. In this case, in step S12e, the fluctuation rate ratio (RCPi) is compared with a predetermined fluctuation rate ratio determination threshold value ($RCPi_{SL}$), and in a case where the fluctuation rate ratio (RCPi) is smaller than the fluctuation rate ratio determination threshold value ($RCPi_{SL}$), it is determined that the state is a steady operation state, and the processing proceeds to step S3.

Figure 9:
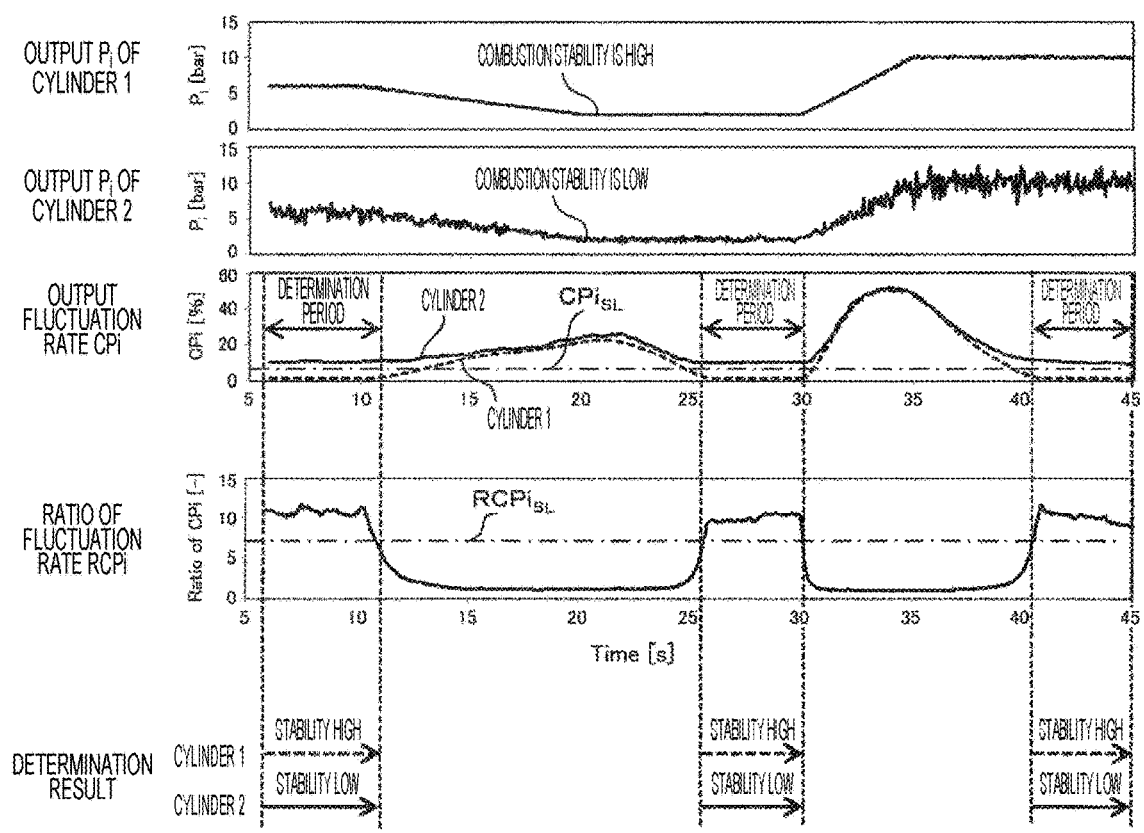
FIG. 9 is an explanatory view for explaining a determination result of combustion stability based on temporal changes of indicated mean effective pressures and output fluctuation rates of two cylinders according to the second embodiment in a case where operation is switched between a steady operation state and a transient operation state.

Next, operations and effects of the present embodiment will be described with reference to FIG. 9. FIG. 9 illustrates changes of indicated mean effective pressures (Pi), output fluctuation rates (CPi), and fluctuation rate ratios (RCPi) of a cylinder 1 and a cylinder 2 in a case where a multi-cylinder internal-combustion engine is operated so that the internal-combustion engine includes a steady operation state and a transient operation state. The fluctuation rate ratio (RCPi) is a value obtained by "RCPi=CPimax/CPimin". The changes of the indicated mean effective pressures (Pi) and the output fluctuation rates (CPi) are the same as those of FIG. 3.

As illustrated in FIG. 9, the fluctuation rate ratio (RCPi) is large in a case where the internal-combustion engine is in a steady operation state and is small in a case where the internal-combustion engine is in a transient operation state. This is because the output fluctuation rate (CPi) in the steady operation state represents only a torque fluctuation component for each combustion cycle resulting from combustion instability, whereas the output fluctuation rate (CPi) in the transient operation state represents a sum of a torque fluctuation component for each combustion cycle resulting from combustion instability and a torque fluctuation component of engine torque itself resulting from a predetermined transient change. Therefore, for the same reason as that described with reference to FIG. 6, the fluctuation rate ratio (RCPi) is small in a cylinder having low combustion stability as compared with a cylinder having high combustion stability.

In view of this, combustion stability is determined from a value of the output fluctuation rate (CPi) only in a case where the fluctuation rate ratio (RCPi) is larger than the predetermined fluctuation rate ratio determination threshold value ($RCPi_{SL}$). That is, combustion stability is determined only in a steady operation state, and erroneous determination of combustion stability in the transient operation state can be prevented. Since combustion stability is accurately determined in the steady operation state as described above, control parameter correction control is appropriately performed on a cylinder having low combustion stability in steps S13 and S14 illustrated in FIG. 4, and thereby fuel efficiency and exhaust purification performance of the internal-combustion engine can be improved.

In a case where the fluctuation rate ratio (RCPi) is obtained by "RCPi=CPimin/CPimax", the changes of the fluctuation rate ratios (RCPi) are opposite to the characteristic illustrated in FIG. 9. Therefore, it is only necessary to determine combustion stability from the value of the output fluctuation rate (CPi) only when the fluctuation rate ratio (RCPi) is larger than the predetermined fluctuation rate ratio determination threshold value ($RCPi_{SL}$).

Although a method for determining a steady operation state or a transient operation state by using in-cylinder pressures of at least two or more cylinders has been proposed in the above description, other parameters may also be used. For example, time change rates of physical quantities related to engine output, such as a throttle valve opening degree, a fuel injection amount per unit cycle, an intake air amount per unit cycle, an intake pipe air pressure, an engine rotational speed, and a maximum value Pmax of an in-cylinder pressure are regularly monitored, and in a case where the time change rates are equal to or less than a predetermined value, it may be determined that the state is a steady operation state, and in a case where the time change rates are equal to or larger than the predetermined value, it may be determined that the state is a transient operation state.

Note, however, that in a case where a steady operation state or a transient operation state is determined by using an output fluctuation rate (CPi) of an in-cylinder pressure as described in the above embodiment, the following special operations and effects are produced.

In a case where the output fluctuation rate (CPi), which is used as an index value for determining stability of combustion, is also used to determine an engine steady operation state or a transient operation state, processing from determination of (1) a steady operation state or a transient operation state to determination of (2) combustion stability is simplified. This can reduce calculation load on the control unit 100.

Furthermore, since the output fluctuation rate (CPi) of the in-cylinder pressure is an index that directly represents an engine torque fluctuation of the internal-combustion engine, a steady operation state or a transient operation state can be more accurately determined with less time delay as compared with a case where an index that indirectly represents engine output such as a throttle valve opening degree, a fuel injection amount, or an air flow amount is used.

Embodiment 3

In a multi-cylinder internal-combustion engine, there is a risk that combustion stability of all cylinders may be lowered due to a significant change in environmental conditions and fuel properties, deterioration of mechanical parts, and the like. In this case, even in a case where correction control is performed on a specific cylinder having low combustion stability, it is difficult to maintain fuel efficiency performance, output performance, and exhaust purification performance of the internal-combustion engine.

Figure 10:
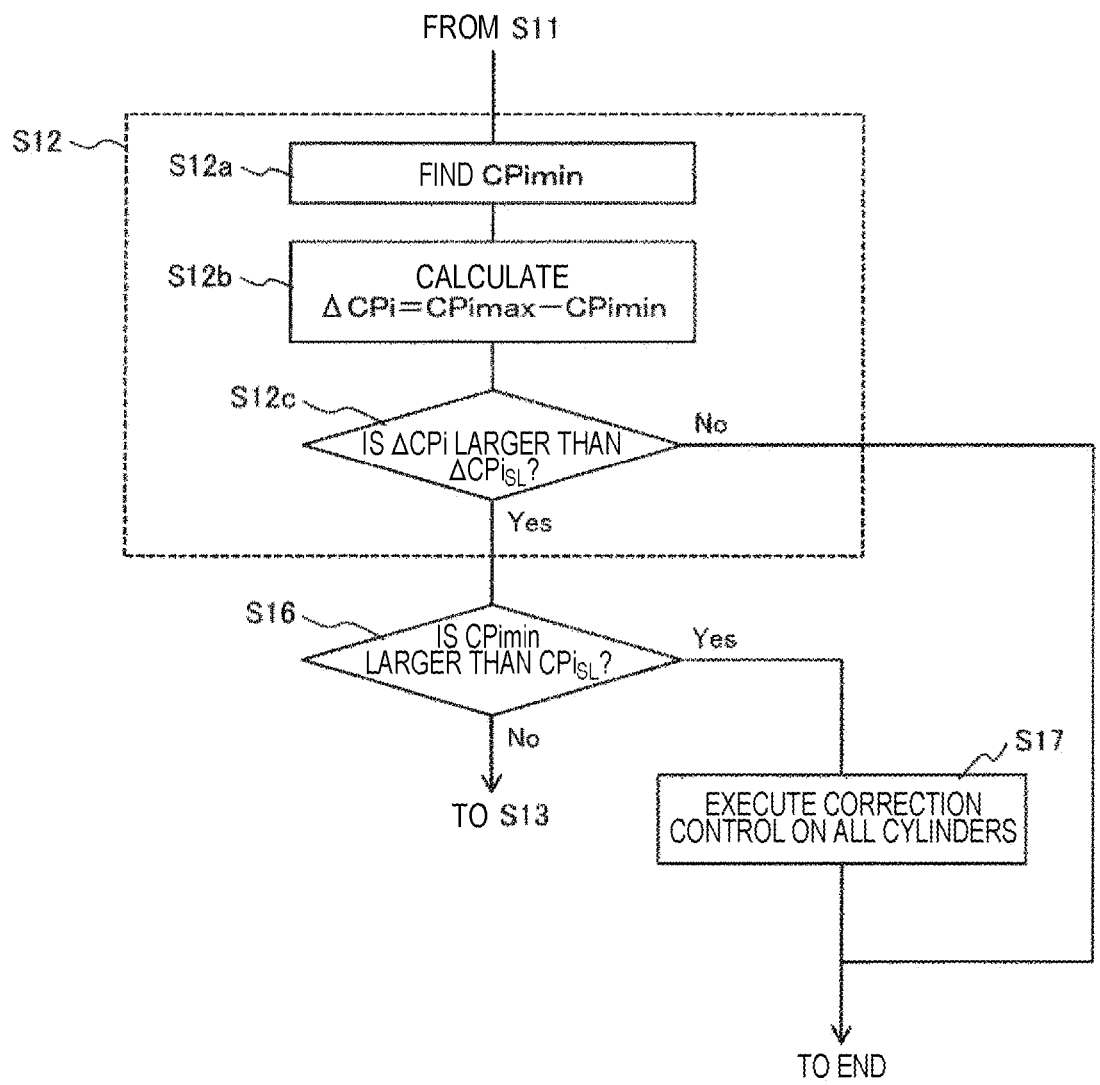
FIG. 10 is a flowchart illustrating a procedure for determining a steady operation state or a transient operation state and correction control performed on all cylinders according to the third embodiment of the present invention.

In view of, in a case where combustion stability of all cylinders becomes low, it is desirable to detect this and perform appropriate control parameter correction control on all the cylinders. FIG. 10 illustrates an internal-combustion engine control procedure for realizing this. The procedure of FIG. 10 is obtained by adding control step S16 and control step S17 between step S12 for determining a steady operation state and a transient operation state and step S13 for determining combustion stability in the internal-combustion engine control processing flow illustrated in FIG. 4.

In the control processing flow illustrated in FIG. 10, in a case where it is determined in step S12 that the state is a steady operation state, a minimum value (CPimin) of an output fluctuation rate among output fluctuation rates (CPi) of respective cylinders is compared with a predetermined fluctuation rate determination threshold value (CPiSL) in step S16. A reason why the minimum value (CPimin) is compared is that the other cylinders have a larger output fluctuation rate (CPi) (less stable combustion) than the minimum value (CPimin). In a case where the minimum value (CPimin) is larger than the fluctuation rate determination threshold value ($CPi_{sL}$), it is determined that all cylinders have a problem with combustion stability, and the processing proceeds to step S17.

On the other hand, in a case where the output fluctuation rate n minimum value (CPimin) is smaller than the fluctuation rate determination threshold value ($CPi_{sL}$), the processing proceeds to steps S13 and S14 as in FIG. 4 to execute control parameter correction control on a cylinder having a maximum output fluctuation rate.

Since it is determined in step S16 that all cylinders have low combustion stability, control parameter correction control is executed on all cylinders in step S17. This control is, for example, correction such as reducing an air-fuel ratio of all cylinders (to a value close to a theoretical air-fuel ratio) or lowering an EGR rate of all cylinders and thereby reducing a dilution rate. Further, in this case, it is desirable to give a warning to an operator, for example, by turning on a warning light.

In this way, even in a case where combustion stability of all cylinders is low, correction control for stabilizing combustion is performed on all the cylinders, and thereby fuel efficiency performance, output performance, and exhaust purification performance of the internal-combustion engine can be maintained. In a case where combustion stability of a specific cylinder is low, correction control is performed on this cylinder, and thereby the internal-combustion engine can obtain high fuel efficiency as a whole.

As described above, the present invention is characterized by including an output fluctuation value calculation unit that calculates an output fluctuation value for each cylinder based on a detection result obtained from a physical quantity detection unit that detects a physical quantity that fluctuates engine torque of an internal-combustion engine; and a state determination unit that determines whether the internal-combustion engine is in a transient operation state or a steady operation state based on a difference or a ratio between a first output fluctuation value of a predetermined first cylinder and a second output fluctuation value of a predetermined second cylinder that are calculated by the output fluctuation value calculation unit.

According to this configuration, even in a case where operation is switched between the steady operation state and the transient operation state in order to perform combustion failure determination in a section determined as the steady operation state, a combustion failure state of an air-fuel mixture of a cylinder can be accurately determined.

The present invention is not limited to above embodiments and encompasses various modifications. For example, the above embodiments have been described in detail to explain the present invention in an easy-to-understand manner and are not necessarily limited to one having all the described elements. Further, one or more of elements of one embodiment may be replaced with an element of another embodiment. Further, an element of one embodiment may be added to elements of another embodiment. Moreover, addition, deletion, or substitution of an element is possible as for one or more of elements of each embodiment.

REFERENCE SIGNS LIST 10 cylinder head and cylinder
11 piston
12 intake valve
13 exhaust valve
14 fuel injection valve
15 spark plug
16 air cleaner
17 throttle valve
18 intake port
19 exhaust port
20 exhaust gas purification catalyst
21 air flow sensor
22 in-cylinder pressure sensor
23 crank angle sensor
100 control unit

The invention claimed is:

1. An internal-combustion engine control device comprising a controller including an output fluctuation value calculation unit that calculates an output fluctuation value for each cylinder at least based on a detection result obtained from a physical quantity detection unit that detects a physical quantity that fluctuates engine torque of the internal-combustion engine, and a state determination unit that determines whether the internal-combustion engine is in a transient operation state or a steady operation state based on a difference or a ratio between a first output fluctuation value of a predetermined first cylinder and a second output fluctuation value of a second cylinder different from the first cylinder that are calculated by the output fluctuation value calculation unit.

2. The internal-combustion engine control device according to claim 1, wherein
the state determination unit determines that the first cylinder and the second cylinder are in the steady operation state in a case where the difference or the ratio between the first output fluctuation value of the first cylinder and the second output fluctuation value of the second cylinder is equal to or larger than a state determination threshold value; and
the state determination unit determines that the first cylinder and the second cylinder are in the transient operation state in a case where the difference or the ratio between the first output fluctuation value of the first cylinder and the second output fluctuation value of the second cylinder is less than the state determination threshold value.

3. The internal-combustion engine control device according to claim 1, wherein
the state determination threshold value is changed in accordance with at least one of engine torque, an engine rotational speed, an oil temperature, and a water temperature.

4. The internal-combustion engine control device according to claim 1, wherein
the controller includes:

a combustion determination region setting unit that sets a section of the steady operation state as a combustion determination region in a case where the state determination unit determines that the first cylinder and the second cylinder are in the steady operation state, and a combustion failure determination unit that determines that the first cylinder or the second cylinder has combustion failure in a case where an output fluctuation value of the first cylinder or the second cylinder calculated by the output fluctuation value calculation unit is equal to or larger than a setting value in the combustion determination region set by the combustion determination region setting unit.

5. The internal-combustion engine control device according to claim 4, wherein the combustion determination region setting unit sets a section of the transient operation state as a combustion determination prohibition region in a case where the state determination unit determines that the first cylinder and the second cylinder are in the transient operation state.

6. The internal-combustion engine control device according to claim 1, wherein the controller includes:

a combustion determination region setting unit that sets a section of the steady operation state as a combustion determination region in a case where the state determination unit determines that the first cylinder and the second cylinder are in the steady operation state, and a control parameter correction unit that corrects a control parameter of the first cylinder or the second cylinder in a case where an output fluctuation value of the first cylinder or the second cylinder calculated by the output fluctuation value calculation unit is equal to or larger than a setting value in the combustion determination region set by the combustion determination region setting unit.

7. The internal-combustion engine control device according to claim 1, wherein a physical quantity detected by the physical quantity detection unit is any one of a throttle valve opening degree, an intake air pressure, an air flow amount, a fuel injection amount, a maximum in-cylinder pressure, and a rotational speed.

8. The internal-combustion engine control device according to claim 2, wherein the physical quantity detection unit detects an in-cylinder pressure based on a signal obtained from an in-cylinder pressure sensor provided in each of four or more cylinders.

9. The internal-combustion engine control device according to claim 8, wherein the output fluctuation value calculation unit calculates an output fluctuation rate that is a standard deviation of an indicated mean effective pressure for a predetermined combustion cycle of each of the cylinders and calculates a difference or a ratio between a maximum value and a minimum value of the output fluctuation rate of each of the cylinders; and the state determination unit compares the difference or the ratio between the maximum value and the minimum value of the output fluctuation rate with a predetermined state determination threshold value and determines that the state is the steady operation state in a case where it is determined that the difference or the ratio between the maximum value and the minimum value of the output fluctuation rate is larger than the predetermined state determination threshold value and determines that the state is the transient operation state in a case where it is determined that the difference or the ratio between the maximum value and the minimum value of the output fluctuation rate is smaller than the predetermined state determination threshold value.

10. The internal-combustion engine control device according to claim 9, wherein the controller includes:

a combustion determination region setting unit that sets a section of the steady operation state as a combustion determination region in a case where the state determination unit determines that the first cylinder and the second cylinder are in the steady operation state, and a control parameter correction unit that corrects at least one of a fuel injection amount, a fuel injection timing and an ignition timing of the first cylinder or the second cylinder in a case where the output fluctuation rate of the first cylinder or the second cylinder calculated by the output fluctuation value calculation unit is equal to or larger than a predetermined combustion determination threshold value in the combustion determination region set by the combustion determination region setting unit.

* * * * *